(12) United States Patent
Carbone et al.

(10) Patent No.: US 8,533,077 B1
(45) Date of Patent: Sep. 10, 2013

(54) APPARATUS AND METHOD FOR OPERATING A COLD STORAGE FACILITY AS A MASTER LIMITED PARTNERSHIP

(75) Inventors: Matthew P. Carbone, San Rafael, CA (US); Edmond G. Leung, San Ramon, CA (US)

(73) Assignee: American Infrastructure Funds, LLC, Foster City, CA (US)

( * ) Notice: Subject to any disclaimer, the term of this patent is extended or adjusted under 35 U.S.C. 154(b) by 0 days.

(21) Appl. No.: 13/488,335

(22) Filed: Jun. 4, 2012

Related U.S. Application Data

(63) Continuation of application No. 13/168,905, filed on Jun. 24, 2011, now abandoned.

(51) Int. Cl.
*G07B 17/00* (2006.01)

(52) U.S. Cl.
USPC ............... 705/30; 705/36 R; 705/35; 705/38; 705/307; 701/208

(58) Field of Classification Search
USPC ........................................... 705/30; 701/208
See application file for complete search history.

(56) References Cited

U.S. PATENT DOCUMENTS

| | | | | |
|---|---|---|---|---|
| 4,034,735 | A * | 7/1977 | Waldrip | 126/576 |
| 5,991,876 | A | 11/1999 | Johnson et al. | |
| 6,766,322 | B1 * | 7/2004 | Bell | 1/1 |
| 7,734,540 | B2 | 6/2010 | Ramsey | |
| 7,797,225 | B1 | 9/2010 | Kemp et al. | |
| 7,865,416 | B1 | 1/2011 | Graff et al. | |
| 2002/0004757 | A1 | 1/2002 | Torres et al. | |
| 2002/0013750 | A1 | 1/2002 | Roberts et al. | |
| 2002/0099563 | A1 | 7/2002 | Adendorff et al. | |
| 2002/0161679 | A1 | 10/2002 | Randolph et al. | |
| 2005/0091150 | A1 | 4/2005 | Woeber | |
| 2007/0219712 | A1 * | 9/2007 | Abhyanker | 701/208 |
| 2008/0046353 | A1 * | 2/2008 | Poltorak et al. | 705/37 |
| 2008/0109385 | A1 | 5/2008 | Baker | |
| 2009/0018875 | A1 * | 1/2009 | Monatesti et al. | 705/7 |
| 2009/0228306 | A1 * | 9/2009 | Izyayev et al. | 705/4 |
| 2010/0205085 | A1 | 8/2010 | Ramsey | |
| 2011/0004483 | A1 * | 1/2011 | Ting et al. | 705/1.1 |
| 2012/0190386 | A1 * | 7/2012 | Anderson | 455/456.3 |

OTHER PUBLICATIONS

AARP, Public Policy Institute, The Death Care Industry, May 2000, 8 pgs.

Associated Press, "Investors Target Wests Water Rights/Easterners Hope Value Will Jump", Colorado Springs Gazette-Telegraph, Aug. 16, 1988: B8, 2 pgs.

Beckett, "Utilities/Big Spurt in Water Investments/The Gold Rush of '89 Focuses on Water to Serve Growing West", San Francisco Chronicle, Apr. 10, 1989: C1, 3 pgs.

(Continued)

*Primary Examiner* — Vanel Frenel
(74) *Attorney, Agent, or Firm* — Cooley LLP

(57) ABSTRACT

A computer readable storage medium includes a master limited partnership module with instructions to distinguish a cold storage facility real estate owner from a cold storage facility service operator. The receipt of cold storage rental fees and cold storage service fees is tracked. The cold storage rental fees, but not the cold storage service fees, are attributed to the cold storage facility real estate owner. Master limited partnership income is distributed based upon the cold storage rental fees.

2 Claims, 2 Drawing Sheets

(56) References Cited

OTHER PUBLICATIONS

Berry et al., "Master Limited Partnerships: The Hot New Form of Business Organization", NJ, Law and Business, Inc., 1986, p. i-25, 14 pgs.
Canada Newswire, "CI Announces Proposed Merger Details for Limited Partnerships", Ottawa: Apr. 9, 2001, 3 pgs.
Ciccotello et al., "Contracts Between Managers and Investors: A Study of Master Limited Partnership Agreements", Robinson College of Business Administration, Georgia State University, Atlanta, Jun. 1999, 47 pgs.
Colby, "Recents Trends in Southwestern Water Values", The Appraisal Journal, vol. 59, No. 4, ProQuest Central, Oct. 1991, pp. 488-500.
Denmark, "Looming Water Shortages Create Wave of Blue' Investing", Institutional Investor, ProQuest, Sep. 2010, 3 pgs.
Downes et al., "Dictionary of Finance and Investment Terms—5th Edition", Barron's Educational Series, Inc., Hauppauge, NY, 1998, 3 pgs.
Global Water Intelligence, "The Right to Invest in Water", vol. 10, Issue 5, May 2009, 2 pgs.
Goodgame, "Master Limited Partnership Governance", The Business Lawyer, vol. 60, Feb. 2005, pp. 471-506.
Green Hills Memorial Park, General Price List, Feb. 15, 1995, 3 pgs. [online] [retrieved on Jan. 14, 2008] Retrieved from the Internet: <URL:http://web.archive.org/web/19990219192616/www.greenhillsmemorial.com/merch.html>.
Illinois Landfill Capacity, "Solid Waste Landfill Owners and Operators: Alphabetical by Facility", Nonhazardous Solid Waste Management and Landfill Capacity in Illinois, 1996, 3 pgs.
Michelsen et al., "Expectations In Water-Right Prices", Water Resources Development, vol. 16, No. 2, Jun. 2000, pp. 209-219.
Miller, "The Garbage Behind, The Garbage Ahead", Gotham's Garbage: The Free Market and The Hidden Costs of Turning Trash Into Cash, Oct. 6, 2001, 13 pgs.
New York State, "Cemetery Bulletin", Department of State, Division of Cemeteries, Mar. 2000, No. 4, 2 pgs.
Peltier, "Lawsuit Blames New York Landfills for Health Woes", Waste News, vol. 6, Issue 44, Apr. 22, 2001, p. 49, 2 pgs.
PR Newswire, "AmeriGas Partners $100 Million Senior Notes Affirmed 'BB+' by Fitch IBCA—IBCA—", New York: Aug. 17, 1998, 3 pgs.
Puget Sound Regional Council, "Funding for Local Government Infrastructure", Sep. 2009, 76 pgs.
Reilly, "The Language of Real Estate", Chicago, 2000, 2 pgs.
Trimble Funeral Homes, Frequently Asked Questions, 5 pgs. [online] [retrieved on Jan. 14, 2008]Retrieved from the Internet <URL: http://web.archive.org/web/20010709015456/http://www.trimblefuneralhomes.com/>.
Twenty-First Century, "Twenty-First Century Partnership Systems Products/Services", 2 pgs., Wayback Machine Internet Archived webpage dated Jul. 16, 2007, <http://web.archive.org/web20070716055932/www.21stcenturycompany.com/partnership_systems.htm>.
The Wall Street Journal, "Alcan Keeps Terms to Itself of Proposal for Some Arco Assets", New York, NY, Mar. 30, 1984: 1, 2 pgs.
Benamraoui, "Islamic Banking: the Case of Algeria", International Journal of Islamic and Middle Eastern Finance and Management, vol. 1, No. 2, 2008, pp. 113-131.
Karasik et al., "Islamic Finance in a Global Context: Opportunities and Challenges", Chicago Journal of International Law, 7(2): 379-396, Winter 2007, retrieved from http://search.proquest.com/docview/237219993?accountid=14753.
Tariq, "Managing Financial Risks of Sukuk Structures", Sep. 2004, 86 pgs.

* cited by examiner

APPARATUS AND METHOD FOR OPERATING A COLD STORAGE FACILITY AS A MASTER LIMITED PARTNERSHIP

CROSS-REFERENCE TO RELATED APPLICATIONS

This application is a continuation of U.S. Ser. No. 13/168,950, filed Jun. 24, 2011, now abandoned entitled "Apparatus and Method for Operating a Cold Storage Facility as a Master Limited Partnership", which is related to U.S. Ser. No. 10/306,836, filed Nov. 27, 2002, entitled "Apparatus and Method for Operating a Death-Care Business as a Master Limited Partnership", U.S. Ser. No. 11/558,371, filed Nov. 9, 2006, entitled "Apparatus and Method for Converting Investment Capital into Publicly Traded and Private Master Limited Partnerships", U.S. Ser. No. 12/028,741, filed Feb. 8, 2008, entitled "Apparatus and Method for Operating a Landfill Business as a Master Limited Partnership", and U.S. Ser. No. 12/909,320, filed Oct. 21, 2010, entitled "Apparatus and Method for Operating Public Infrastructure as a Master Limited Partnership." The content of each application is incorporated herein by reference.

FIELD OF THE INVENTION

This invention relates generally to the operation of a cold storage facility. More particularly, this invention relates to a computer-implemented technique for operating a cold storage facility as a master limited partnership.

BACKGROUND OF THE INVENTION

A master limited partnership is a corporate organization governed by a contract between management (e.g., general partners) and investors (e.g., limited partners). A master limited partnership combines the tax benefits of a limited partnership with the liquidity of publicly traded securities. The master limited partnership was originally conceived as an organizational structure to capitalize on mature, low growth, cash generating businesses. Accordingly, master limited partnerships have been used in such industries as oil, gas, real estate, and natural resources.

Master limited partnerships typically carry dividend yields (e.g., 7-10%). As such, the securities generally trade on a yield basis. In the current market environment, such securities are in high demand due to their superior yield and the lower perceived risk of the stable underlying business.

In a master limited partnership, partners receive cash distributions rather than dividends. Unlike a corporation, qualifying, publicly traded master limited partnerships are not subject to federal and state income taxes. Instead, all income, gains, losses and deductions of a partnership are passed through to the partners who are required to report their allocable share on their individual tax returns. Cash distributions are generally not currently taxable as long as the partner's tax basis in the partnership interest exceeds zero.

The ideal master limited partnership is cash flow positive, but generates minimal taxable income through heavy depreciation, amortization, depletion, and the like. In a partnership, tax losses and gains are passed through to the partners, but when a partnership distributes more cash than it reports as taxable income, the cash distribution amount in excess of the partner's allocable share of income is treated as a return of capital for tax purposes. Thus, under this scenario, each time an investor receives a cash distribution, the return of capital tax treatment lowers his basis in the stock rather than creating dividend income that is taxable as ordinary income in the current period.

In view of these tax advantages, master limited partnerships are predominantly retail products sold to high net worth individuals and other tax paying entities. Most master limited partnerships generate unrelated business taxable income that prevents most institutional investors from being able to invest in master limited partnerships.

The tax advantages of master limited partnerships were greatly reduced through the Tax Reform Act of 1987. In addition, the lines of business in which tax exempt master limited partnerships can operate were greatly limited through the same tax act.

According to the Internal Revenue Code, Section 7704(d), in order for a publicly traded partnership to avoid being taxed as a corporation, it must generate more than 90% of its gross income from qualifying sources, referred to as qualifying income. Master limited partnerships can have wholly-owned taxable subsidiaries to hold the assets that generate non-qualifying income. With this structure, an entity can generate less than 90% of its income from qualifying sources and still qualify as a master limited partnership by dropping the non-qualifying assets into the taxable subsidiary. The primary disadvantage with this structure is that the subsidiary is unable to shield its income from taxes and any dividends that are routed to the master limited partnership are subject to double taxation. The master limited partnership suffers a valuation discount for every dollar of taxes paid by the taxable subsidiary.

In view of the narrowing scope of qualifying industries through the Tax Reform Act of 1987 and the inefficiencies outlined above in restructuring businesses that have both qualifying and non-qualifying activities, the use of master limited partnerships outside of the natural resource sector has declined. In addition, despite the Tax Reform Act of 1987 preserving the qualification relating to the sale and/or rental of real property, there have only been several instances of the MLP structure being utilized in a business conducting the sale or rental of real property. Most companies engaged in the ownership, sale and rental of real property have elected to organize under the Real Estate Investment Trust (REIT) structure.

Notwithstanding the general decline in the use of master limited partnerships outside of the natural resource sector, it would be advantageous to identify a commercially sensible mechanism for exploiting a master limited partnership in connection with the operation of a cold storage facility. More particularly, it would be desirable to provide a computer-implemented technique for operating a cold storage facility as a master limited partnership in order to provide new financial options for cold storage businesses or for entities interested in investing in cold storage businesses.

SUMMARY OF THE INVENTION

The invention includes a computer implemented method for separating cold storage facility real estate ownership from cold storage facility service operations to form a cold storage facility real estate owner and a cold storage facility service operator. Rental fees received by the cold storage facility real estate owner are tracked. The rental fees are processed in accordance with terms of a master limited partnership.

A computer readable storage medium includes a master limited partnership module with instructions to distinguish a cold storage facility real estate owner from a cold storage facility service operator. The receipt of cold storage rental fees and cold storage service fees is tracked. The cold storage rental fees, but not the cold storage service fees, are attributed to the cold storage facility real estate owner. Master limited partnership income is distributed based upon the cold storage rental fees.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
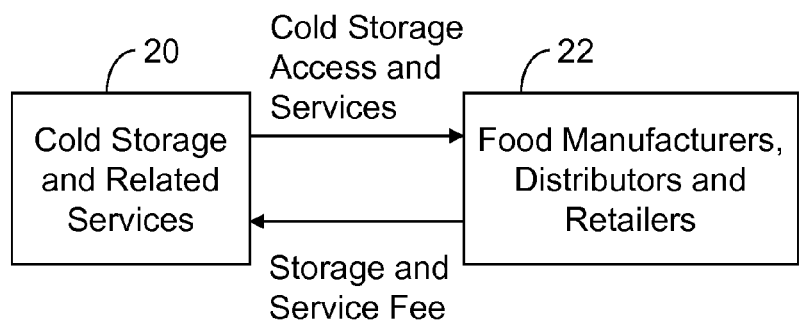
FIG. 1 illustrates the current manner in which cold storage and related services are utilized by food manufacturers, distributors and retailers.
Figure 2:
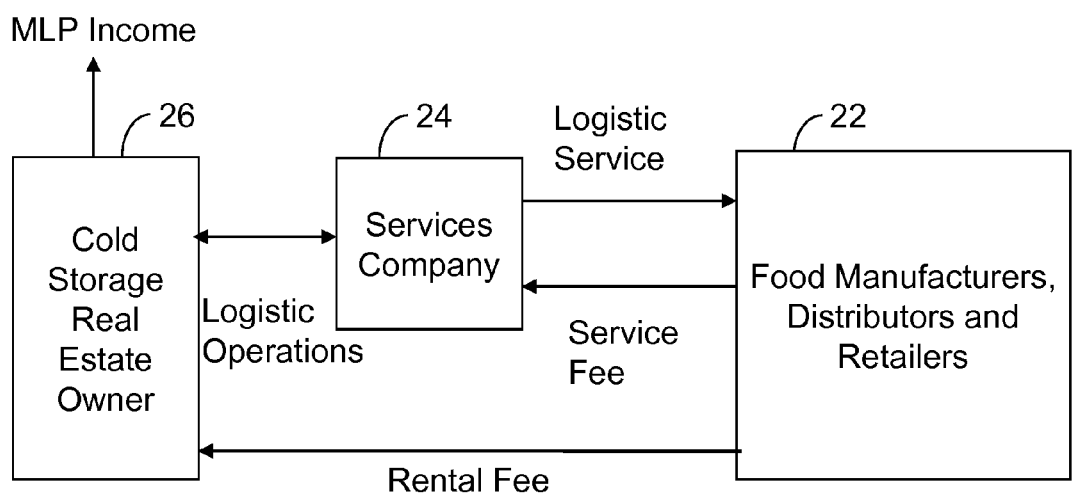
FIG. 2 illustrates a new technique for operating a cold storage facility business as a master limited partnership in accordance with an embodiment of the invention.

FIG. 1 illustrates the current operation of a typical cold storage facility. A consumer 22, for example a food manufacturer, distributor or retailer, pays a storage and service fee to access cold storage and related services 20. The consumer typically secures a volume of space in a cold storage facility, but does not have a reserved location (i.e., a specific space). In addition, the consumer typically does not have access to the cold storage facility. Rather, product handling services, such as loading and unloading goods from trucks and into and out of the cold storage facility, are typically handled by employees of the cold storage facility.

In accordance with the invention, cold storage service operations are separated from cold storage real estate. The cold storage real estate includes the real property and the fixed physical structures associated with the cold storage facility.

A cold storage real estate owner 26 is organized as a master limited partnership (MLP). As used herein, the term real estate owner means an actual owner of subject real estate or one with lease rights to the subject real estate. The cold storage real estate owner 26 receives real estate rental fees from a consumer 22 (e.g., food manufacturers, distributors and/or retailers). Real estate rental fees constitute qualifying income under Internal Revenue Code, Section 7704(d). Therefore, the cold storage real estate owner 26 generates MLP income.

A services company 24 provides logistic operations, such as product handling services. The consumer pays a service fee for this logistic service. The service fee is non-qualifying MLP income, which is isolated from the MLP by the services company 24.

The resultant MLP may be taken public through a public securities offering of limited partner units. Using the techniques of the invention, a portfolio of geographically diverse cold storage facilities may be constructed to generate a stable and consistent cash flow that is valued considerably higher than the value of current corporate holding structures. Thus, the invention allows cold storage facilities to access competitively priced capital.

By restructuring cold storage facilities into MLP qualifying assets, the invention maximizes the value of such assets to better align the long-term contracted cash flows of cold storage facilities with a security that is valued on cash distributions and yield. If a cold storage business is structured as a corporation, it will be predominantly valued on a price-to-earnings ratio or other earnings-related metric. Despite the fact that cold storage businesses have attractive operating margins, the assets may be under-appreciated and under-valued within corporate structures, given their fixed-life and low-to-no-growth earnings profile. In contrast, MLPs with stable recurring cash flows are valued on a yield basis.

The invention may be implemented with any number of ownership structures. For example, a fund may purchase 100% ownership of the cold storage real estate from an existing cold storage business. The real estate asset is then structured as an MLP with the fund owning 98% of the limited partner interest and a services company general partner owning a 2% limited partner interest. The original management owns 100% of the newly formed services company. Any number of alternate ownership arrangements may be utilized in accordance with embodiments of the invention.

Figure 3:
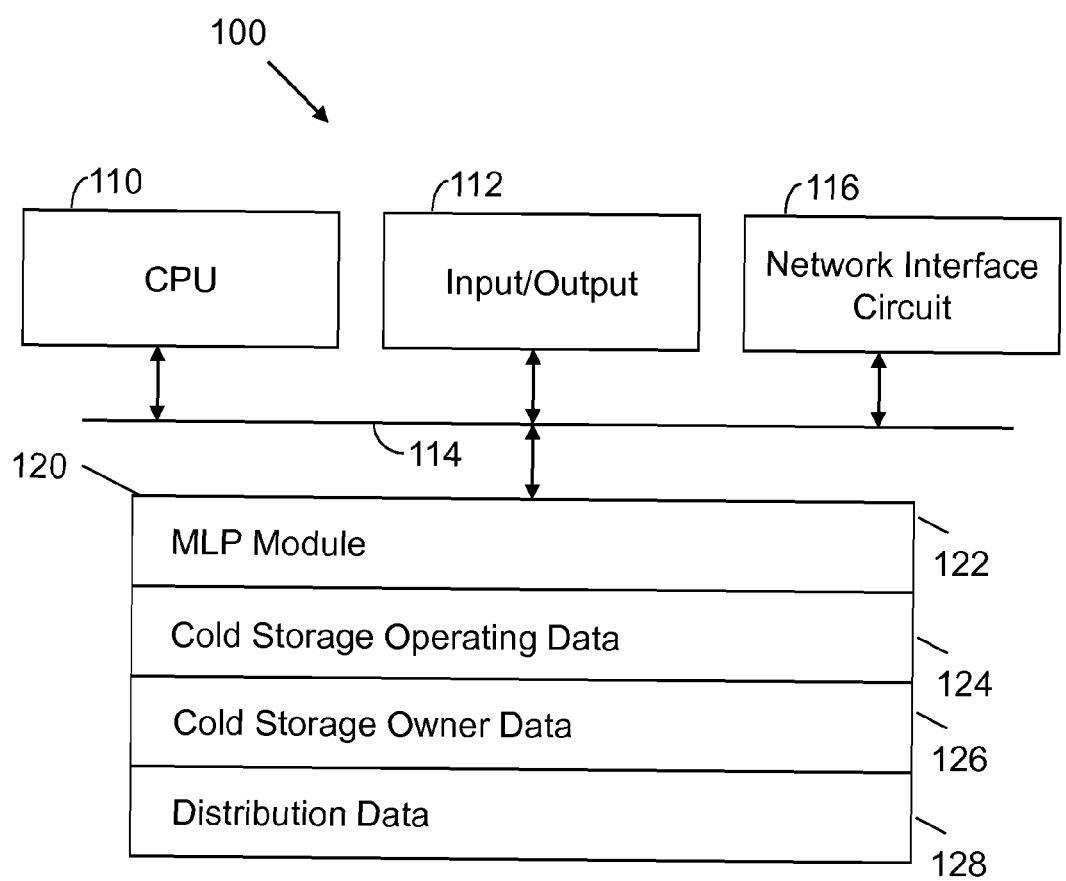
FIG. 3 illustrates a computer configured to implement operations associated with an embodiment of the invention.

FIG. 3 illustrates a computer 100 to implement operations of the invention. The computer 100 includes standard components, such as a central processing unit 110 connected to input/output devices 112 via a bus 114. The input/output devices 112 may include a keyboard, mouse, touchpad, display, printer and the like. A network interface circuit 116 is also connected to the bus 114 and provides access to a network (not shown). Thus, the computer 100 may operate in a networked environment.

A memory 120 is also connected to the bus 114. The memory 120 includes executable instructions to implement operations associated with the invention. The memory 120 stores an MLP module 122. The MLP module 122 includes executable code defining the terms and conditions of a cold storage master limited partnership. The cold storage master limited partnership defines the relationships between the cold storage business managers (e.g., the general partners) and the cold storage business investors (e.g., the limited partners). The agreement specifies operating parameters, such as ownership interests, capital structures, investment policies, cash distribution levels, and management rights. The MLP module 122 operates to separate cold storage real estate ownership from service operations and thereby specify a cold storage real estate owner and a cold storage services operator. The cold storage real estate owner is then monitored in accordance with the terms of the underlying cold storage MLP. By way of example, the executable code of the MLP module 122 may include a set of conditional (e.g., if-then-else) statements that control rights and resources in accordance with an underlying cold storage master limited partnership agreement. A software engineer using well known programming techniques can prepare the executable code based upon the terms of the cold storage master limited partnership agreement.

The MLP module 122 accesses cold storage operating data 124. For example, the cold storage operating data 124 may include service fees received by the cold storage services company. The MLP module 122 also accesses cold storage owner data 126, which may include information on rental fees (e.g., fees collected for spatial volumes in the cold storage facility). The MLP module 122 uses the rental fees and the terms of the cold storage MLP to compute distribution data 128. The distribution data 128 specifies MLP income that is distributed to partners.

The memory 120 may include additional modules, such as a regulatory report module (not shown). The regulatory report module includes executable instructions to process the data in memory and produce regulatory data. The regulatory data may include information on dividend data. The regulatory data may be submitted to the Securities and Exchange Commission and similar regulatory bodies.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer, comprising:
   a processor; and
   a memory connected to the processor, wherein the memory stores a master limited partnership module with instructions executed by the processor to
      distinguish a cold storage facility real estate owner from a cold storage facility service operator;
      track the receipt of cold storage rental fees and cold storage service fees;
      attribute the cold storage rental fees, not the cold storage service fees, to the cold storage facility real estate owner; and
      distribute master limited partnership income based upon the cold storage rental fees.

2. The computer of claim 1 wherein the master limited partnership module further comprises instructions to ascribe the cold storage service fees to the cold storage facility service operator.

* * * * *